(12) United States Patent
Chiron

(10) Patent No.: US 12,421,465 B2
(45) Date of Patent: Sep. 23, 2025

(54) GASIFICATION PROCESS EMPLOYING ACID GAS RECYCLE

(71) Applicant: HALDOR TOPSØE A/S, Kgs. Lyngby (DK)

(72) Inventor: François-Xavier Pascal Thierry Chiron, Aigremont (FR)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 963 days.

(21) Appl. No.: 16/323,819

(22) PCT Filed: Oct. 3, 2017

(86) PCT No.: PCT/EP2017/075029
§ 371 (c)(1),
(2) Date: Feb. 7, 2019

(87) PCT Pub. No.: WO2018/072989
PCT Pub. Date: Apr. 26, 2018

(65) Prior Publication Data
US 2021/0284927 A1    Sep. 16, 2021

(30) Foreign Application Priority Data
Oct. 17, 2016  (DK) .......................... PA 2016 00633

(51) Int. Cl.
*C10K 1/00* (2006.01)
*C10J 3/84* (2006.01)
(Continued)

(52) U.S. Cl.
CPC ............... *C10K 1/004* (2013.01); *C10J 3/84* (2013.01); *C10K 1/046* (2013.01); *C10K 1/08* (2013.01);
(Continued)

(58) Field of Classification Search
CPC ..................................................... C10K 1/004
(Continued)

(56) References Cited

U.S. PATENT DOCUMENTS 2,075,510 A * 3/1937 Davis ..................... C01B 21/26
                                                             423/403
3,528,930 A   9/1970 Schlinger et al.
(Continued)

FOREIGN PATENT DOCUMENTS

CN      105143169      * 12/2015
CN      102159684      *  8/2018
(Continued)

OTHER PUBLICATIONS

Libre Texts Chemistry. "2.2 Concentration". 2024. https://chem.libretexts.org/Courses/Providence_College/CHM_331_Advanced_Analytical_Chemistry_1/02%3A_Basic_Tools_of_Analytical_Chemistry/2.02%3A_Concentration (Year: 2024).*
(Continued)

*Primary Examiner* — Sheng H Davis
(74) *Attorney, Agent, or Firm* — Boone IP Law

(57) ABSTRACT

A method for converting a feedstock comprising solid hydrocarbons to a sweet synthesis gas, involving the steps
 a. gasifying said feedstock in the presence of steam, an oxygen rich gas and an amount of sour process gas to form a raw synthesis gas optionally comprising tar,
 b. optionally conditioning said raw synthesis gas to a sour shift feed gas,
 c. contacting said sour shift feed gas with a sulfided material catalytically active in the water gas shift process for providing a sour hydrogen enriched synthesis gas, (Continued)

d. separating $H_2S$ and $CO_2$ from said sour hydrogen enriched synthesis gas, for providing said sour recycle gas and a sweet hydrogen enriched synthesis gas.

18 Claims, 2 Drawing Sheets

(51) Int. Cl.
*C10K 1/04* (2006.01)
*C10K 1/08* (2006.01)
*C10K 1/34* (2006.01)
*C10K 3/04* (2006.01)

(52) U.S. Cl.
CPC .................. *C10K 1/34* (2013.01); *C10K 3/04* (2013.01); *C10J 2300/092* (2013.01); *C10J 2300/0946* (2013.01); *C10J 2300/0956* (2013.01); *C10J 2300/0976* (2013.01); *C10J 2300/0986* (2013.01); *C10J 2300/1659* (2013.01); *C10J 2300/1662* (2013.01); *C10J 2300/1668* (2013.01); *C10J 2300/1807* (2013.01); *C10J 2300/1892* (2013.01)

(58) Field of Classification Search
USPC .......................................................... 252/373
See application file for complete search history.

(56) References Cited

U.S. PATENT DOCUMENTS

| | | | |
|---|---|---|---|
| 3,598,527 A | 8/1971 | Quartulli et al. | |
| 3,993,457 A | 11/1976 | Cahn et al. | |
| 4,892,717 A * | 1/1990 | Hass | C01B 17/164 423/655 |
| 8,722,003 B1 | 5/2014 | Avagliano et al. | |
| 8,846,564 B2 | 9/2014 | Wang et al. | |
| 2007/0129450 A1* | 6/2007 | Barnicki | C10G 2/30 518/703 |
| 2009/0152208 A1* | 6/2009 | Agrawal | C02F 1/20 210/758 |
| 2010/0081567 A1* | 4/2010 | Wang | C01B 3/16 502/216 |
| 2010/0096594 A1* | 4/2010 | Dahlin | B01D 53/10 252/372 |
| 2011/0067306 A1 | 3/2011 | Balmas et al. | |
| 2011/0088897 A1 | 4/2011 | Raman | |
| 2011/0168605 A1* | 7/2011 | Blevins | C10J 3/487 422/187 |
| 2011/0229382 A1* | 9/2011 | Frydman | C10K 1/004 422/621 |
| 2012/0238645 A1 | 9/2012 | Ruedlinger | |
| 2013/0085307 A1* | 4/2013 | Yukumoto | C10K 1/024 422/187 |
| 2015/0005398 A1* | 1/2015 | Chakravarti | C10J 3/00 518/702 |
| 2016/0368767 A1* | 12/2016 | Chiche | C01B 3/16 |
| 2017/0021322 A1 | 1/2017 | Wix et al. | |
| 2022/0229382 A1* | 7/2022 | Inoue | G03G 15/0891 |

FOREIGN PATENT DOCUMENTS

| | | | |
|---|---|---|---|
| EP | 2650258 A2 | | 10/2013 |
| ID | p000510908 | * | 3/2011 |
| WO | WO2015091490 | * | 6/2015 |
| WO | 2015150420 A1 | | 10/2015 |

OTHER PUBLICATIONS

Danish Search Report dated Mar. 30, 2017, by the Danish Patent Office for corresponding Danish Application No. PA2016 00633.
International Search Report (PCT/ISA/210) issued on Jan. 2, 2018, by the European Patent Office as the International Searching Authority for International Application No. PCT/EP2017/075029.
Written Opinion (PCT/ISA/237) issued on Jan. 2, 2018, by the European Patent Office as the International Searching Authority for International Application No. PCT/EP2017/075029.

* cited by examiner

GASIFICATION PROCESS EMPLOYING ACID GAS RECYCLE

The present invention relates to a method for converting a feedstock comprising solid hydrocarbons to a gas rich in hydrogen by gasification of the feedstock, sour shift of the feedstock and recycle of a sour gas.

In processes for conversion of a solid feedstock to a gaseous product, it is common to convert the solid feedstock into a synthesis gas by gasification in the presence of carbon dioxide. Subsequently the ratio between $H_2$ and CO is adjusted by the water gas shift (WGS) reaction, shifting an amount of CO to $H_2$. As the typical water gas shift reaction is carried out in the absence of sulfur (in sweet mode) on catalyst materials sensitive to sulfur poisoning, acid gas removal (AGR) is required upstream the shift reaction. Since the WGS reaction produce $CO_2$ a further AGR is employed downstream the WGS reaction, to balance the ratio of reactants in the synthesis gas and to avoid excess equipment size. It is desirable to reduce the amount of equipment, and therefore a process in which AGR is only required once will be beneficial. Such a process could involve the use of sulfur resistant catalyst, a so-called sour shift catalyst, based on e.g. sulfided material such as cobalt in combination with molybdenum or tungsten on an appropriate support. Such a catalyst does, however, require the presence of sulfur to be active, and therefore feedstocks with a moderate or low presence of sulfur, e.g. biological or renewable feedstocks, are not suited for such a process, since the amount of sulfur in the feedstock is too low for maintaining the sour shift catalyst active (sulfided), but at the same time too high for operating WGS in sweet mode.

Now according to the present invention a process has been developed which may provide a synthesis gas with an adjusted module, while only requiring a single AGR, by employing a sour shift process. This may be carried out at intermediate to high sulfur levels (above 100 ppmv). When the amount of sulfur is below 100 ppmv, such a configuration may be enabled by providing an elevated sulfur level in the process gas by recycling of the sour gas from the AGR, which has the effect of maintaining the sulfur level sufficient for maintaining the catalyst activated.

The method may be used in the production of methane, methanol or other products from for synthesis gas, in which case the ratio between $H_2$ and CO in the adjusted synthesis gas would be adjusted to the appropriate ratio for the desired reaction, before being directed to AGR and subsequently directed to contact a material catalytically active in methanation.

The method may also be used in the production of ammonia, in which case an amount of $N_2$ would be present and as much as possible of CO would be converted to $CO_2$ and removed, before being directed to AGR and subsequently directed to contact a material catalytically active in formation of ammonia.

Where concentrations in the gas phase are given, they are, unless otherwise specified given as molar concentration.

In the following the term sweet shift shall be used for a water gas shift process taking place in the presence of less than 0.1 ppmv sulfur compounds employing a catalytically active material which is deactivated by sulfur compounds, such as copper or zink.

In the following the term water gas shift process shall be used for a chemical process in which CO and $H_2O$ reacts to form $H_2$ and $CO_2$.

In the following the term sour shift shall be used for a water gas shift process taking place in the presence of sulfur compounds employing a catalytically active material which is not deactivated by sulfur compounds, such as nickel, cobalt, molybdenum and cobalt.

In the following the module of a synthesis gas is a dimensionless number indicating the balance between CO and $H_2$, and compensating for the presence of $CO_2$ shall be defined as $M=(H_2-CO_2)/(CO+CO_2)$.

In a broad aspect the present invention relates to a method for converting a feedstock comprising solid hydrocarbons to a sweet synthesis gas, involving the steps
 a. gasifying said feedstock in the presence of steam, an oxygen rich gas and an amount of sour process gas to form a raw synthesis gas optionally comprising tar,
 b. optionally conditioning said raw synthesis gas to a sour shift feed gas,
 c. contacting said sour shift feed gas with a sulfided material catalytically active in the water gas shift process for providing a sour hydrogen enriched synthesis gas,
 d. separating $H_2S$ and $CO_2$ from said sour hydrogen enriched synthesis gas, for providing said sour recycle gas and a sweet hydrogen enriched synthesis gas
with the associated benefit of providing a process having only a single step for separating $H_2S$ and $CO_2$ from the synthesis gas, while maintaining a sufficient amount of sulfur in the synthesis gas for keeping said material catalytically active in the water gas shift process sulfided, and thus active.

In a further embodiment said sulfided material catalytically active in the water gas shift process comprises 1-5% cobalt, 5-15% molybdenum or tungsten and a support comprising one or more metal oxides, such as alumina, magnesia, titanium or magnesium-alumina spinel, with the associated benefit of such a material being active in the presence of sulfur.

In a further embodiment said sour process gas comprises at least 200 ppmv sulfur with the associated benefit of 200 ppmv sulfur in the recycled sour process gas being sufficient for maintaining sulfidation of the material catalytically active in the water gas shift process.

In a further embodiment said step (a) comprises the step of directing the tar to contact a material catalytically active in converting hydrocarbons to CO and $H_2$ with the associated benefit of such steps substantially removing condensable material phases from said raw synthesis gas.

In a further embodiment said step (b) comprises at least one of the following steps
 b.i heat recovery by transfer of thermal energy to a heat exchange medium,
 b.ii removal of tar,
 b.iii removal of particulate matter,
 b.iv compression
with the associated benefit of such added process steps of reducing the sensitivity of down stream process steps to undesired synthesis gas characteristics.

In a further embodiment said oxygen rich gas is either atmospheric air or atmospheric air having undergone an oxygen enrichment procedure with the associated benefit of atmospheric air being readily available and with the associated benefit of oxygen enriched air of reducing the size of the gasifier and downstream equipment, by reducing the volume of synthesis gas as well as avoiding a presence of nitrogen which will reduce the product quality of many final products, such as SNG.

In a further embodiment said sweet hydrogen enriched gas is directed to contact a material having a sulfur absorption capacity prior to contacting said material catalytically active in methanation, with the associated benefit of reducing the risk of sulfur leaks deactivating the material catalytically active in methanation.

In a further embodiment said feedstock comprises an amount of sulfur resulting in from 80 ppmv to 500 ppmv $H_2S$ and COS in the synthesis gas, with the associated benefit of such a process of enabling continuous operation of a sulfided water gas shift process using a sulfided catalytically active material with a feedstock having a low sulfur content.

In a further embodiment said feedstock comprises material taken from the group of plant material, animal material, biological waste, industrial waste and household waste with the associated benefit of a method employing such material being operational with little or no addition of sulfur In a further embodiment said feedstock comprises a sulfur dopant, taken from the group of sulfur rich biological material, sulfur rich waste or sulfur containing chemicals with the associated benefit of addition of a process receiving a feedstock comprising a minor amount of sulfur, may be enabled by addition of a specific sulfur dopant.

A further aspect of the present disclosure relates to a method for production of methane involving production of a sweet synthesis gas according to a method described above, involving the further step of directing said sweet hydrogen enriched synthesis gas to contact a material catalytically active in methanation, for providing a gas rich in methane with the associated benefit of converting a solid feedstock to SNG In a further embodiment said material catalytically active in methanation is cooled by thermal contact with a heat exchange medium in step e, and optionally transfer said heat exchange medium to step b.i if present with the associated benefit of cooling said catalytically active material being a well controlled process temperature, and with the further associated benefit from transferring the heat exchange medium to heat recovery of the raw synthesis gas of heating the heat exchange medium to a more attractive temperature, e.g. for heating steam to be superheated steam. If another heat exchange medium such as oil is used, the increased temperature may also be beneficial.

A further aspect of the present disclosure relates to a method for production of ammonia involving production of a sweet synthesis gas according to any of the previous claims, involving the further step of directing said sweet hydrogen enriched synthesis gas to contact a material catalytically active in formation of ammonia, for providing a gas rich in ammonia. with the associated benefit of converting a solid feedstock to ammonia A further aspect of the present disclosure relates to a method for production of methanol or dimethyl-ether involving production of a sweet synthesis gas according to any of the previous claims, involving the further step of directing said sweet hydrogen enriched synthesis gas to contact a material catalytically active in formation of methanol or dimethyl-ether, for providing a gas rich in methanol or dimethyl-ether with the associated benefit of converting a solid feedstock to methanol, and ammonia.

A further aspect of the present disclosure relates to a method for production of a hydrocarbon involving production of a sweet synthesis gas according to any of the previous claims, involving the further step of directing said sweet hydrogen enriched synthesis gas to contact a material catalytically active in the Fischer Tropsch process, for providing a product rich in hydrocarbons with the associated benefit of converting a solid feedstock, such as a renewable feedstock to hydrocarbons.

Methane is an attractive fuel, available as the major constituent of natural gas. It is therefore a fuel, which is compatible with current and well known infrastructure, such as gas pipelines. In countries where natural gas is not available, production of methane from synthesis gas, has been used to convert coal by gasification and methanation.

Similarly, methanol is an attractive raw material in many processes, including production of plastic, formaldehyde and synthetic gasoline.

Biological feedstocks are favorable energy sources, especially when considering the greenhouse gas emissions related to fossil feedstocks. However, like coal, many biological feedstocks are also solids, which are difficult to transport, and therefore a method for converting biological feedstocks into e.g. synthetic natural gas (SNG) will beneficial, but also synthetic gasoline or ammonia may be formed from biological feedstocks.

In the conversion of solid carbonaceous feedstocks to synthesis gas a typical process according to the prior art would involve the following steps Gasification, forming a synthesis gas optionally comprising a tar fraction
Tar reforming or removal, if tar is present
Gas cleaning and conditioning
Compression
Acid gas removal (AGR-$H_2S$ and partial $CO_2$ removal)
Adjustment of the synthesis gas by water gas shift (WGS)
Further AGR ($CO_2$ removal)

The gas cleaning and conditioning may involve various methods, including adsorption of tars and heavy hydrocarbons on activated carbon, hydrogenation of olefins and oxygen and use of a catalytically active material as a guard bed, e.g. for withdrawing chloride.

The synthesis gas after these steps would be a "sweet gas" with less than 10 ppmv sulfur, and depending on composition it may be used in a wide range of processes.

Typically, gasification would be carried out in the presence of $CO_2$ to control the product gas composition by performing shift related processes and reduce the amount of carbonaceous char produced in the gasification chamber by the Boudouard reaction where $CO_2$ and C react to form 2 CO.

The tar reforming process may take place on a partially sulfided nickel catalyst, and thus will be able to operate in the presence of sulfur. Similarly, a sulfided catalyst may be chosen for the water gas shift reaction, which will require a minimum amount of sulfur in the raw gas. Therefore, if a sulfided shift catalyst is used, it may be necessary to add sulfur for operation. It has now been identified that this may be obtained by withdrawing the sour gas from AGR and directing it to the gasifier and/or the tar reformer, as it will provide an amount of sulfur in the gas contacting the catalytically active material in the tar reformer and the WGS process, which will be sufficient for maintaining sulfidation of the catalytically active material.

In the conversion of solid carbonaceous feedstocks with a limited amount of sulfur, to synthesis gas a process according to the present disclosure could instead involve the following steps Gasification, forming a synthesis gas optionally comprising a tar fraction
Tar reforming or removal, if tar is present
Gas cleaning and conditioning
Compression
Adjustment of the synthesis gas by WGS on a sulfided catalyst AGR with recycle of the sour gas to gasification and/or tar reformer Optionally the balance between $CO_2$ and sulfur in the sour gas may be adjusted by use of an acid gas enrichment (AGE) unit.

For the production of SNG, it is desired to avoid nitrogen in the process gas, and therefore the gasifier it preferably operated in the absence of nitrogen, either in the form of operation on pure oxygen, obtained from purified atmospheric air, or in the form of indirect gasification e.g. in a circulating fluidized bed, where a fluidized solid is heated by combustion in one chamber, and transfers the heat to the material to be gasified in a different chamber. If biological materials are gasified directly, the module will typically be below 2—and if $CO_2$ is added to the gasifier, the module may be decreased further. If the intended product is SNG, the sweet synthesis gas may be directed to a methanation section, which may be based on a pseudo-isothermal reactor, such a boiling water reactor, which may be pressurized water having a temperature around 300° C. Such boiling water reactor produces saturated steam at 300° C. and condensing steam turbines have typically low electrical efficiency It is therefore beneficial from a heat integration point of view to superheat the saturated steam by heat exchange with the product from the gasifier or the tar reformer, which typically will have a temperature around 700° C. to 900° C.

If the desired product is another hydrocarbon or oxygenate, such as synthetic gasoline, dimethyl ether, Fischer Tropsch wax or methanol, the feed gas composition, the reactor, the catalytically active material and the conditions may have to be altered, but in principle the process layout will be the same as for production of SNG.

For the production of ammonia, nitrogen and hydrogen only, are desired in the process gas, and therefore the gasifier it preferably operated on atmospheric air. As mentioned, it is preferable to control the gasification temperature by dilution of the feedstock to be gasified by $CO_2$, which is the main component in the sour gas. The sweet synthesis gas, after AGR, may be directed to a material catalytically active in formation of ammonia, which may be positioned in a reactor forming a part of a so-called ammonia loop.

If the biological feedstock has a low content of sulfur, additional sulfur may be added, either in the form of sulfur rich biological material such as manure, sludge or straw, fossil feedstocks or a chemical rich in sulfur, such as DMDS (di-methyl di-sulfide). DMDS may be added in any position upstream sour shift (or tar reforming if that is included) whereas materials which require gasification may be added together with the biological feedstock.

Production of methane is favorably carried out by adjusting the synthesis gas to have a ratio between $H_2$ and CO of 3, either directly in the feed, or in by stepwise addition to arrive at this ratio. This synthesis gas may then be directed to contact a material catalytically active in methanation, such as elemental nickel on an appropriate support. As methanation is highly exothermic, and the equilibrium is shifted away from the desired product at elevated temperatures it may be beneficial to carry this process out in a pseudo-isothermal reactor, or in multiple reactors, with intermediate cooling. For a process employing reactors with intermediate cooling, this is typically carried out by using steam as a heat transfer medium, and the temperature out of the first reactor will be sufficient for super-heating the steam to be used in e.g. a steam turbine. If a pseudo-isothermal reactor, such as a boiling water reactor, is used, the reaction temperature will typically be below the temperature for super-heating steam, such that the value of the steam will be rather low.

Production of methanol is carried out by adjusting the synthesis gas to have a ratio between $H_2$ and CO of 2. This synthesis gas may then be directed to contact a material catalytically active in formation of methanol, such as elemental copper on an appropriate support. As the methanol synthesis is highly exothermic, and the equilibrium is shifted away from the desired product at elevated temperatures it may be beneficial to carry this process out in a pseudo-isothermal reactor, or in multiple reactors, with intermediate cooling. Methanol may be reacted further to form gasoline, olefins, aromatics or di-methyl-ether and several other compounds.

Production of hydrocarbons is carried out by adjusting the synthesis gas to have a ratio between $H_2$ and CO of 2. This synthesis gas may then be directed to contact a material catalytically active in the Fischer-Tropsch process, such as elemental iron or any known F-T catalyst on an appropriate support. Such Fischer-Tropsch reactions are commonly carried out in slurry reactors or in fluidized bed reactors.

Production of ammonia is carried out by adjusting the synthesis gas to be substantially free of CO. In addition, $N_2$ must be available in the $N_2$ to $H_2$ of 3. This synthesis gas may then be directed to contact a material catalytically active in ammonia synthesis, typically comprising iron.

A common characteristic of many biological feedstocks is the low amount of sulfur resulting in a syngas (after gasification) with 0 to 200 ppmv total sulfur. This can be compared with coal gasification where the syngas downstream the gasifier can be 1 to 2 vol % $H_2S$. In many catalytic processes, sulfur is considered a catalyst poison, e.g. ("sweet") WGS in the presence of copper or iron, and therefore the absence of sulfur may be considered a benefit. However, if a catalyst such as cobalt/molybdenum is used in WGS a minimum amount of sulfur is required to ensure that the catalyst remains sulfided and thus active.

FIGURES

The following elements are referred to in the drawings. For ease of understanding the numbering is reused for elements having a similar function, but it does not imply identical function of the elements having similar numbers.

Figure 1:
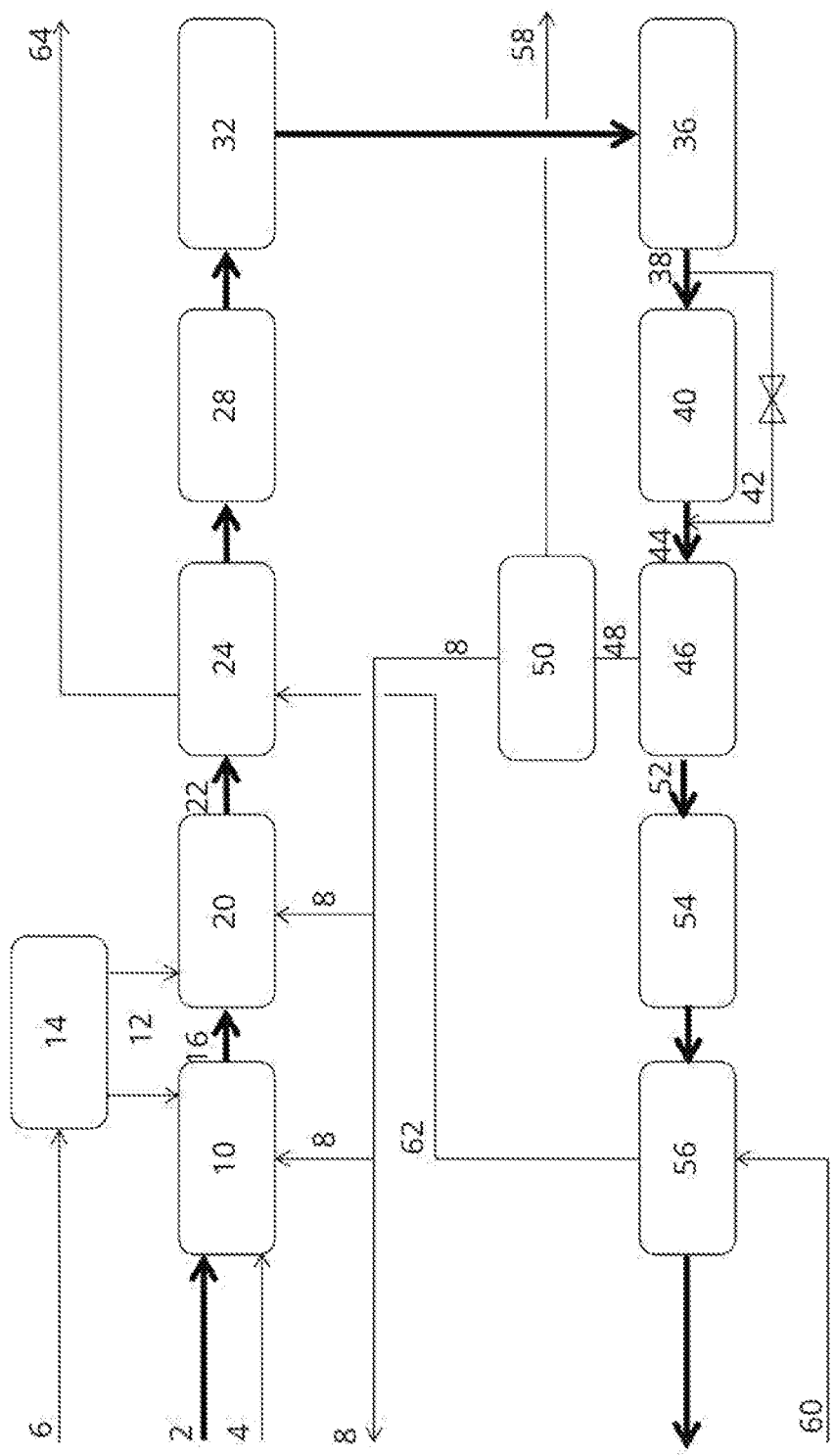
FIG. 1 shows a process for gasification of a feedstock according to an embodiment of the present disclosure.

Feedstock 2
Steam 4
$O_2$ rich gas 12
$CO_2$ rich gas 8
Gasifier 10
Raw synthesis gas 16
Atmospheric air 6
Air separation unit 14
Tar reformer 20
Tar-free synthesis gas 22
Heat exchange 24
Filter 28
Gas wash 32
Compressor 36
Sour shift feed gas 38
Sour shift reactor 40
Shifted synthesis gas 44
By-passed synthesis gas 42

Sweet synthesis gas 52
Acid gas removal (AGR) process 46
Acid gas 48
Acid gas enrichment 50
Sulfur guard 54
Synthesis section 56
Water 60
Saturated steam 62
Superheated steam 64
Tar cooling/filtering unit 68
Tar removal unit 70
Tar 72
Initial AGR unit 74
Waste gas 76
Pre-methanation unit 78
Methanation unit 80
SNG 82

FIG. 1 shows a process for gasification of a feedstock to form a sweet synthesis gas according to an embodiment of the present disclosure. In FIG. 1, a feedstock 2, steam 4, an $O_2$ rich gas 12 and a $CO_2$ rich sour recycle gas 8 are directed to a gasifier 10, which typically operates at 700° C. to 1000° C., and converts the feedstock 2 to a raw synthesis gas 16 comprising CO and $H_2$. The $O_2$ rich gas 12 may be substantially pure $O_2$, obtained from atmospheric air 6, via an air separation unit 14, or in alternative embodiments atmospheric air or atmospheric air enriched in $O_2$ depending on the desired product of synthesis. An amount of tar may also be present in the raw synthesis gas 16. The raw synthesis gas 16 is in the embodiment of FIG. 1 directed to an optional tar reformer 20, which also receives an $O_2$ rich gas 12. In the tar reformer 20 the raw synthesis gas 16 contacts a material catalytically active in conversion of hydrocarbons such as anthracene or naphtalene to $H_2$ and CO, providing a tar-free synthesis gas. The material may comprise nickel as the catalytically active material, which is not deactivated in the presence of moderate amounts of sulfur such as below 500 ppmv, e.g. partially sulfided nickel. Optionally the tar reformer may also be replaced by a tar removal unit or even omitted if the amount of tar if very low. The sour recycle gas 8 is added to the tar reformer to promote conversion of char to CO, to control the temperature development by dilution and if the catalyst in the tar reformer is sulfided, sulfur present in the sour recycle gas 8 will also assist in maintaining the catalytically active material sulfided. The tar-free synthesis gas 22 is cooled by heat exchange 24, and subsequently filtered 28 to remove alkali metal residue and other particles. The filtered synthesis gas is directed to a gas wash 32, where soluble impurities, such as chloride and ammonia are removed, providing a cleaned gas, having a temperature around 40° C. The cleaned gas is compressed 36, typically to 30 bar, and directed as sour shift feed gas 38 to a sour shift reactor 40 containing a material active in WGS in the presence of sulfur, providing a shifted gas. The composition of the sour shifted synthesis gas 44 is controlled by the conditions in the sour shift reactor 40, the amount of steam added upstream reactor 40 and the amount of by-passed synthesis gas 42. The sour shifted gas 44 will contain "acid gas" in the form of some $CO_2$ from the WGS process and sulfur, typically in the form of $H_2S$. The acid gas 48 is separated from a sweet synthesis gas 52, by an acid gas removal (AGR) process 46. The sulfur content of the acid gas 48 is optionally concentrated by acid gas enrichment 50, removing $CO_2$ from a sour recycle gas 8 to be added to one or both of the gasifier 10 and the tar reformer 20. Alternatively, the acid gas enrichment may be omitted and the acid gas 48 may be used directly as sour recycle gas 8. The sweet synthesis gas 52 may then be directed to a synthesis section which may have an optional sulfur guard 54, to capture any remaining sulfur prior to the synthesis section 56, which may be designed for production of chemicals such as methane, methanol, dimethyl-ether, hydrocarbons or ammonia. The synthesis of these is exothermic, and therefore the synthesis section 56 is typically cooled by a cold heat exchange media 60. In the embodiment shown in FIG. 1, the cold heat exchange media 60 may be water, which is heated to saturated steam 62 in a boiler or a boiling water reactor and subsequently further heated to form superheated steam 64 downstream the gasifier 10.

In a further, more specific, embodiment of the process according to FIG. 1, biomass in form of wood pellets was fed to a fluidized bed gasifier together with steam and pure $O_2$ from an air separation unit. The gasifier is filled with fluidized material (typically sand and/or olivine) and is run at 10 barg and 850° C. $CO_2$ is typically introduced in the upper part of the bed or in the freeboard.

The gas is, optionally after one or two hot cyclones, fed to a catalytic dusty tar reformer. Oxygen together with steam or $CO_2$, from the AGR is injected to increase the temperature in between catalytic beds. More than 90% of tars are converted to $CO+H_2$, contributing to make more synthesis gas and thus final product.

The gas leaves the tar reformer at about 780° C. and enters a cooling section. Saturated steam produced e.g. in a downstream boiling water reactor which typically may be too cold for use in a turbine can be superheated there.

A bag filter operating at moderate temperatures (below 250° C.) removes the particles and the ashes that went through the tar reformer monoliths as well as through the heat exchangers. The syngas is further cooled and fed to a water scrubber to remove the last traces of particles as well as chlorine and ammonia. Activated carbon beds are then installed to remove the last traces of tars and benzene. These are run at low temperature (about 40° C.).

The clean syngas is then compressed to about 30 bar g and passed through a hydrogenator, a chlorine guard and COS hydrolyzer step before being fed to the sour shift reactor.

The syngas at this point has a lack of hydrogen, therefore some CO is shifted to $CO_2$ (when $H_2O$ is reduced to $H_2$) in the presence of sulfur. A by-pass ensures a good control of the shift so that the syngas is qualified to being fed to the methanation section.

$CO_2$ in excess is removed in an Acid Gas Removal section (amine wash or cold methanol wash or glycol wash) together with $H_2S$. The effluent is recycled back (potentially with the help of a recycle) to the gasification section to enrich the gas in sulfur. The off-gas excess is routed to a sulfur recovery unit such as a WSA unit, a caustic scrubber or a SOLVE™ unit.

The syngas leaving the AGR has a module ($M=H_2—CO_2/CO+CO_2$) of 3 ready for methanation. A sulfur guard ensures that no sulfur breakthrough, contributing to longer methanation catalyst lifetime. A boiling water reactor consisting of one or two passes produces on-spec bio-SNG and recovers the reaction heat as saturated steam (pressure from 80 to 120 bars).

The bio-SNG could be further dried (molecular sieves) and compressed to meet local requirements.

Figure 2:
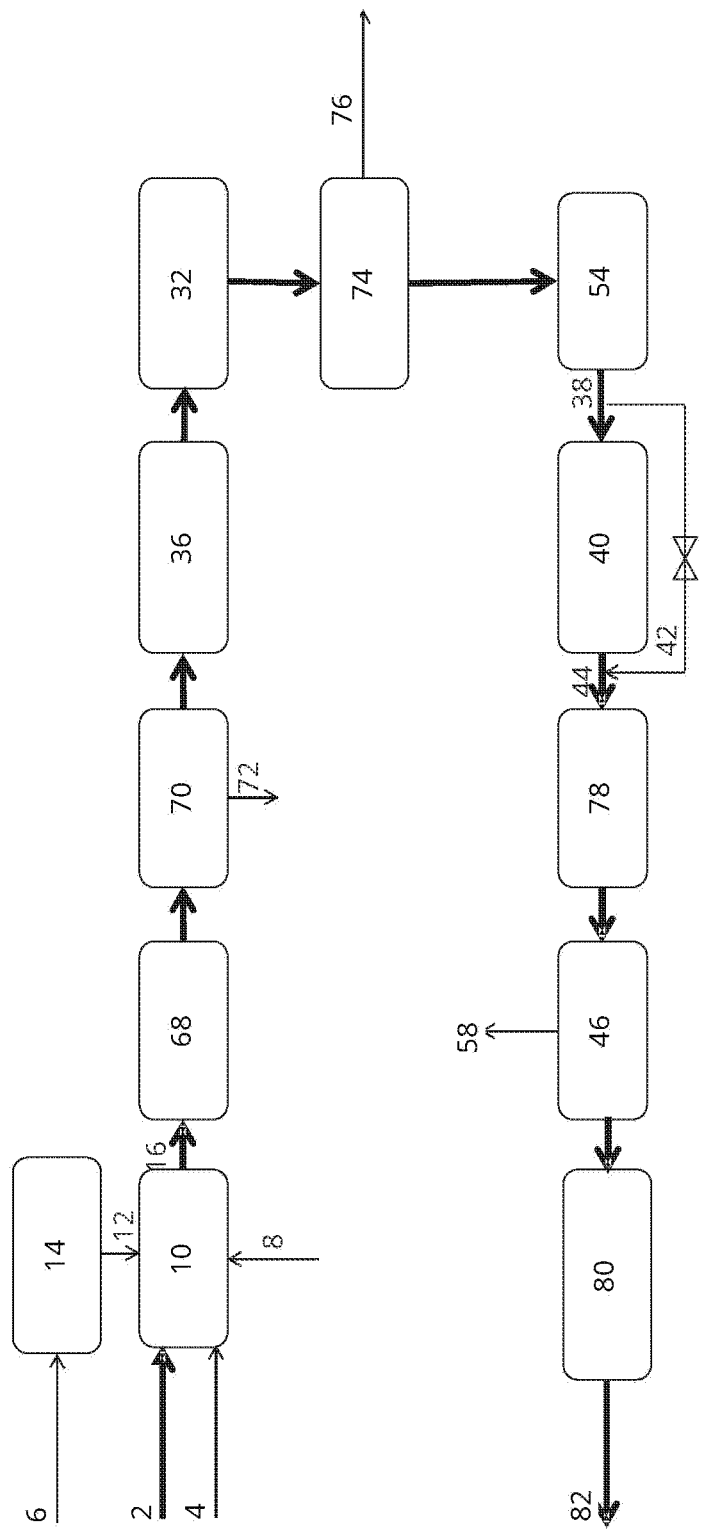
FIG. 2 shows a process for gasification of a feedstock according to an embodiment of the prior art.

FIG. 2 shows a process for gasification of a feedstock to form a sweet synthesis gas according to the prior art. A feedstock 2, steam 4, an $O_2$ rich gas 12 and a $CO_2$ rich gas 8 are directed to a gasifier 10, which typically operates at 700° C. to 1000° C., and converts the feedstock 2 to a raw synthesis gas 16 comprising CO and $H_2$. The $O_2$ rich gas 12 may be substantially pure $O_2$, obtained from atmospheric air 6, via an air separation unit 14, or in alternative embodiments atmospheric air or atmospheric air enriched in $O_2$ depending on the desired product of synthesis. An amount of tar may also be present in the raw synthesis gas 16. The raw synthesis gas 16 is in the embodiment of FIG. 1 directed to a tar cooling/filtering unit 68, followed by a tar removal unit 70, from which tar 73 is removed.

The tar-free synthesis gas is compressed 36, typically to 30 bar, and directed to a gas wash 32, where soluble impurities, such as chloride are removed, providing a cleaned gas, having a temperature around 40° C.-60° C. The low amount of sulfur (less than 80 ppmv) in the cleaned gas is insufficient for operation of a sour WGS process, and therefore the remaining sulfur and $CO_2$ must be removed in an initial AGR unit 74, providing a waste gas 76 comprising $CO_2$ and a small amount of sulfur. The sweet synthesis gas is directed to a sulfur guard 54 providing a sweet WGS feed gas 38 directed to a sweet WGS reactor 40, where the ratio of $H_2$ to CO in the synthesis gas is adjusted to the ratio required by the synthesis process, by the conditions in the sour shift reactor 40 and the amount of by-passed synthesis gas 42. In the embodiment shown in FIG. 1, the desired product is SNG, and accordingly the shifted gas 44a is directed to a pre-methanation unit 78, which also forms an amount of $CO_2$. The $CO_2$ is separated from the intermediate methane rich gas in an AGR unit 46, providing a waste gas 58 comprising $CO_2$. Finally, methanation 80 is completed forming SNG 82.

EXAMPLES

In the following 3 examples of processes for conversion of biomass to synthesis gas are given. Example 1 relates to a process without recycle of sour gas according to the prior art, as illustrated in FIG. 2. Example 2 and 3 relates to processes with recycle of sour gas, as illustrated in FIG. 1.

All examples assume the same biomass feed and a gasification process with presence of $CO_2$.

Example 1

Example 1 relates to a process for conversion of wood pellets to synthesis gas. The hot syngas downstream the gasification chamber, with particles and ashes has a typical volumetric composition as that shown in Table 1, Table 2 and Table 3.

As Example 1 operates without recycle of sour gas, the concentration of $H_2S$ at the outlet of the gas wash will be 80 ppmv, which is too low for operation of a sour shift process, and too high for operation of a sweet shift process. Example 1 is therefore calculated for the operation of a sweet shift process in accordance with FIG. 2. In accordance with normal operation of such gasifiers, pure $CO_2$ is added to the gasifier to support the conversion of carbonaceous char.

Example 2

The same feed as in Example 1, was treated in a process according to the present disclosure, similar to the process shown FIG. 1, but omitting the acid gas enhancement The sour gas recycled will thus contain around 1000 ppmv $H_2S$. With a recycle ratio of 5% the 80 ppmv will be increased to 100 ppmv, which is sufficient for operation of sour shift. Table 2 shows the composition of selected streams in the process of FIG. 1.

Example 3

The same feed as in Examples 1 and 2, was treated in a process according to the present disclosure, similar to the process shown FIG. 1, including the acid gas enhancement, in which an amount of $CO_2$ has been removed from the recycled sour gas. The sour gas recycled will thus contain around 10% $H_2S$. With a recycle ratio of 5% the 80 ppmv will be increased to 300 ppmv, which is sufficient for operation of sour shift. Table 3 shows the composition of selected streams in the process of FIG. 1.

When comparing Examples 1, 2 and 3 it is clear that the product gas is highly similar, and therefore the three processes are identical from an input/output perspective. The extra cost of using two AGR units in Example 1 compared to the recycle configuration of Examples 2 and 3 is however problematic, and will almost always be beneficial to Examples 2 and 3. The choice between Examples 2 and 3, relates to the balance between the reduced recycle volume and the cost of an acid gas enhancement unit.

TABLE 1

| | No recycle | | |
|---|---|---|---|
| | 16 | 38 | 44 |
| H2(g) [%] | 25.11 | 25.24 | 36.49 |
| CH4(g) [%] | 6.20 | 6.23 | 6.23 |
| CO(g) [%] | 16.20 | 16.28 | 5.03 |
| CO2(g) [%] | 23.58 | 23.70 | 34.95 |
| N2(g) [%] | 0.14 | 0.14 | 0.14 |
| H2O(g) [%] | 27.93 | 28.07 | 16.82 |
| H2S(g) ppmv | 70 | 0 | 0 |

TABLE 2

| | AGR to gasifier | | | |
|---|---|---|---|---|
| | 16 | 48/8 | 38 | 44 |
| H2(g) [%] | 24.61 | 0.04 | 24.73 | 35.71 |
| CH4(g) [%] | 6.08 | 0.02 | 6.11 | 6.11 |
| CO(g) [%] | 15.88 | 0.02 | 15.95 | 4.97 |
| CO2(g) [%] | 25.02 | 95.55 | 25.15 | 36.13 |
| N2(g) [%] | 0.14 | 0.00 | 0.14 | 0.14 |
| H2O((g) [%] | 27.46 | 4.28 | 27.59 | 16.61 |
| H2S(g) ppmv | 89 | 1000 | 99 | 99 |

TABLE 3

| | AGR/AGE/Gasifier | | | |
|---|---|---|---|---|
| | 16 | 8 | 38 | 44 |
| H2(g) [%] | 25.18 | 0.00 | 25.18 | 36.40 |
| CH4(g) [%] | 6.22 | 0.00 | 6.22 | 6.22 |
| CO(g) [%] | 16.24 | 0.00 | 16.24 | 5.02 |
| CO2(g) [%] | 23.83 | 80.00 | 23.83 | 35.05 |
| N2(g) [%] | 0.14 | 0.00 | 0.14 | 0.14 |
| H2O(g) [%] | 28.03 | 10.00 | 28.03 | 16.81 |
| H2S(g) ppmv | 300 | 100000 | 300 | 300 |

The invention claimed is:

1. A method for converting a feedstock comprising solid hydrocarbons to a sweet hydrogen enriched synthesis gas, involving the steps
   a. gasifying said feedstock in the presence of steam, an oxygen rich gas and an amount of sour process gas to form a raw synthesis gas, b. optionally conditioning said raw synthesis gas and providing said optionally conditioned raw synthesis gas as a sour shift feed gas, c. contacting said sour shift feed gas with a sulfided material catalytically active in the water gas shift process for converting the sour shift feed gas to a sour hydrogen enriched synthesis gas, d. separating $H_2S$ and $CO_2$ from said sour hydrogen enriched synthesis gas, such that the sour hydrogen enriched synthesis gas is separated into two gases of different composition:
  i. said sour process gas comprising the separated $H_2S$ and $CO_2$; and
  ii. the sweet hydrogen enriched synthesis gas, wherein the concentration of sulfur in a combination of said feedstock, said steam, and said oxygen rich gas is less than the concentration of sulfur in the raw synthesis gas.

2. The method according to claim 1, where said sulfided material catalytically active in the water gas shift process comprises 1-5 wt % cobalt, 5-15 wt % molybdenum or tungsten and a support comprising one or more metal oxides.

3. The method according to claim 1, in which said sour process gas comprises at least 200 ppmv sulfur.

4. The method according to claim 3, wherein the feedstock comprises an amount of sulfur which contributes with 0 to 200 ppmv total sulfur in the raw synthesis gas.

5. The method according to claim 1, wherein the raw synthesis gas comprises tar, in which said step (a) comprises the step of directing the tar to contact a material catalytically active in converting hydrocarbons to CO and $H_2$.

6. The method according to claim 1, wherein the method comprises the step of conditioning said raw synthesis gas in step (b), wherein step (b) comprises treating the raw synthesis gas with at least one of the following steps to provide the sour shift feed gas:
  b.i heat recovery by transfer of thermal energy to a heat exchange medium,
  b.ii removal of tar,
  b.iii removal of particulate matter,
  b.iv compression.

7. The method according to claim 1, in which said oxygen rich gas is either atmospheric air or atmospheric air having undergone an oxygen enrichment procedure.

8. The method according to claim 1, in which said sweet hydrogen enriched synthesis gas is directed to contact a material having a sulfur absorption capacity.

9. The method according to claim 1, in which said feedstock comprises an amount of sulfur resulting in from 80 ppmv to 500 ppmv $H_2S$ and COS in the raw synthesis gas.

10. The method according to claim 1, in which said feedstock comprises material taken from the group of plant material, animal material, biological waste, industrial waste and household waste.

11. The method according to claim 1, in which said feedstock comprises a sulfur dopant, taken from the group of sulfur rich biological material, sulfur rich waste or sulfur containing chemicals sufficient to cause the sour process gas to comprises at least 200 ppmv sulfur.

12. The method according to claim 1, wherein the amount of the sour process gas is selected to at least maintain sulfidation of the sulfided material catalytically active in the water gas shift process.

13. The method according to claim 1, further comprising:
  separating $CO_2$ from the sour process gas, such that the sour process gas is separated into two gases of different composition, a sour recycle gas and a gas comprising the separated $CO_2$, wherein the amount of sour process gas is the sour recycle gas; and
  recycling the sour recycle gas to maintain sulfur levels sufficient for the activity of the sulfided material catalytically active in the water gas shift process.

14. A method for production of methane involving production of a sweet synthesis gas according to claim 1, involving a further step (e) of directing said sweet hydrogen enriched synthesis gas to contact a material catalytically active in methanation, for providing a gas rich in methane.

15. The method according to claim 14, in which said material catalytically active in methanation is cooled by thermal contact with a heat exchange medium in step (e), and optionally transfer said heat exchange medium to a step in which said step (b) comprises treating the raw synthesis gas with heat recovery by transfer of thermal energy to a heat exchange medium to provide the sour shift feed gas, if present.

16. A method for production of ammonia involving production of a sweet synthesis gas according to claim 1, involving the further step of directing said sweet hydrogen enriched synthesis gas to contact a material catalytically active in formation of ammonia, for providing a gas rich in ammonia.

17. A method for production of methanol or dimethylether involving production of a sweet synthesis gas according to claim 1, involving the further step of directing said sweet hydrogen enriched synthesis gas to contact a material catalytically active in formation of methanol or dimethylether, for providing a gas rich in methanol or dimethylether.

18. A method for production of a hydrocarbon involving production of a sweet synthesis gas according to claim 1, involving the further step of directing said sweet hydrogen enriched synthesis gas to contact a material catalytically active in the Fischer Tropsch process, for providing a product rich in hydrocarbons.

* * * * *